(12) United States Patent
Samatov (10) Patent No.: US 11,757,863 B2
(45) Date of Patent: Sep. 12, 2023

(54) SYSTEMS AND METHODS TO PROVIDE INFORMATION AND SERVICES TO AUTHORIZED USERS

(71) Applicant: Yellowpages.com LLC, Glendale, CA (US)

(72) Inventor: Jakhongir Samatov, Los Angeles, CA (US)

(73) Assignee: Thryv, Inc., D/FW Airport, TX (US)

( * ) Notice: Subject to any disclaimer, the term of this patent is extended or adjusted under 35 U.S.C. 154(b) by 0 days.

(21) Appl. No.: 14/509,891

(22) Filed: Oct. 8, 2014

(65) Prior Publication Data

US 2015/0172214 A1 Jun. 18, 2015

Related U.S. Application Data

(63) Continuation of application No. 12/195,334, filed on Aug. 20, 2008, now Pat. No. 8,863,262.

(51) Int. Cl.
| | |
|---|---|
| *H04L 9/40* | (2022.01) |
| *G06Q 30/0601* | (2023.01) |
| *G06F 21/62* | (2013.01) |
| *G06Q 10/087* | (2023.01) |
| *G06Q 30/0251* | (2023.01) |

(Continued)

(52) U.S. Cl.
CPC ...... *H04L 63/0815* (2013.01); *G06F 21/6254* (2013.01); *G06F 21/6263* (2013.01); *G06Q 10/087* (2013.01); *G06Q 30/0257* (2013.01); *G06Q 30/0277* (2013.01); *G06Q 30/0615* (2013.01); *H04L 9/32* (2013.01); *H04L 47/80* (2013.01); *H04L 67/02* (2013.01); *H04L 2209/42* (2013.01); *H04L 2209/56* (2013.01);

(Continued)

(58) Field of Classification Search
CPC . H04L 63/0815; H04L 63/08; H04L 63/0884; H04L 2209/42; H04L 2209/56; H04L 2209/80; H04L 2463/102; G06F 21/6254; G06F 21/6263; G06F 21/6245; G06Q 30/0615; G06Q 30/0641; G06Q 30/0257; G06Q 30/0277; G06Q 10/087
USPC .... 726/3, 5–8; 705/14.4, 14.73, 26.1, 26.41, 705/26.42; 709/225, 229, 219
See application file for complete search history.

(56) References Cited

U.S. PATENT DOCUMENTS

| | | | | |
|---|---|---|---|---|
| 5,815,665 | A | * | 9/1998 | Teper ..................... G06Q 20/00 705/26.35 |
| 5,884,272 | A | * | 3/1999 | Walker ............... G06Q 30/0615 379/93.12 |

(Continued)

OTHER PUBLICATIONS

Google Checkout XML API Developer's Guide, Google Checkout APIs—Google Code, 2008, pp. 1-32 http://code_google.com/apis/checkout/developer/index_html.

(Continued)

*Primary Examiner* — Zachary A. Davis
(74) *Attorney, Agent, or Firm* — GREENSFELDER, HEMKER & GALE, P.C.; Mark E. Stallion (57) ABSTRACT

Systems and methods are provided to authorize users to anonymously access resources of different web sites. For example, a business listing service may authenticate users and allow the authenticated users to access the resources of the businesses listed via the business listing service, without the users having to create separate accounts with the businesses and without having to reveal the identities of the users to the businesses.

23 Claims, 4 Drawing Sheets

(51) Int. Cl.
  *G06Q 30/0241* (2023.01)
  *H04L 9/32* (2006.01)
  *H04L 47/80* (2022.01)
  *H04L 67/02* (2022.01)

(52) U.S. Cl.
  CPC .... *H04L 2209/80* (2013.01); *H04L 2463/102* (2013.01)

(56) References Cited

U.S. PATENT DOCUMENTS

| | | | | |
|---|---|---|---|---|
| 6,157,829 | A * | 12/2000 | Grube | H04M 3/42008 379/213.01 |
| 6,519,568 | B1 * | 2/2003 | Harvey | G01V 11/002 702/14 |
| 6,807,530 | B1 * | 10/2004 | Shub | G06Q 20/12 705/26.42 |
| 6,957,060 | B1 * | 10/2005 | Sharp | H04M 15/39 455/410 |
| 7,137,006 | B1 * | 11/2006 | Grandcolas | G06F 21/41 713/180 |
| 7,296,290 | B2 * | 11/2007 | Barriga | G06F 21/33 726/8 |
| 7,469,233 | B2 * | 12/2008 | Shooks | G06Q 20/00 705/26.42 |
| 7,480,718 | B2 * | 1/2009 | Marcus | H04L 63/0815 709/203 |
| 7,610,390 | B2 * | 10/2009 | Yared | G06F 21/41 709/227 |
| 7,636,941 | B2 * | 12/2009 | Blinn | H04L 63/0815 726/2 |
| 7,680,819 | B1 * | 3/2010 | Mellmer | G06F 21/31 707/783 |
| 8,327,423 | B2 * | 12/2012 | Zeng | G06F 21/33 713/157 |
| 8,670,392 | B2 * | 3/2014 | Kim | H04W 74/002 370/329 |
| 2007/0011054 | A1 * | 1/2007 | Sattler | G06Q 30/0603 705/26.35 |

OTHER PUBLICATIONS

Microsoft Passport Network Privacy Statement, Windows Live ID, Apr. 2005, 5 pages, https://accountservices.passport.net/PPPrivacyStatement.srf.
United States Patent and Trademark Office, Office Action for U.S. Appl. No. 12/195,334, filed Dec. 28, 2011, 14 pages, U.S.A.
United States Patent and Trademark Office, Office Action for U.S. Appl. No. 12/195,334, filed Nov. 23, 2012, 11 pages, U.S.A.
United States Patent and Trademark Office, Office Action for U.S. Appl. No. 12/195,334, filed Oct. 1, 2013, 13 pages, U.S.A.
United States Patent and Trademark Office, Notice of Allowance for U.S. Appl. No. 12/195,334, filed Jun. 9, 2014, 13 pages, U.S.A.
Windows Live ID, Wikipedia, the free encyclopedia, Apr. 28, 2008, pp. 1-3, http://en.wikipedia.org/wikiNVindows_Live_ID.

* cited by examiner

Business: [ Coffee ]—161   Near: [ 93415 ]—163   [ Search ]—167
            Keyword                  Address

---

Star Coffee                              —151

101 Ocean View                          Based on 2 reviews
San Francisco, CA 93415 (0.1 mi, Map)—155   Rate it | Read reviews
1-415-281-1157 (Call or Email or Member Area)
153—   157—    158—        165—

---

Bean Café

102 Ocean View                          Based on 17 reviews
San Francisco, CA 93415 (0.2 mi, Map)   Rate it | Read reviews
1-415-281-3765 (Call or Email or Web Site)
Reservation                             164—
159—

• • •

---

Express Café

102 Bay View                            Based on 12 reviews
San Francisco, CA 93421 (1.1 mi, Map)   Rate it | Read reviews
1-415-781-2513 (Call or Email)

SYSTEMS AND METHODS TO PROVIDE INFORMATION AND SERVICES TO AUTHORIZED USERS

CROSS-REFERENCES TO RELATED APPLICATIONS

This application is a continuation of U.S. Ser. No. 12/195,334, filed on Aug. 20, 2008, the entire disclosure of which is incorporated herein by reference for all purposes.

FIELD OF THE TECHNOLOGY

At least some embodiments disclosed herein relate to user authentication in general and, particularly but not limited to, user authentication for visiting web sites.

BACKGROUND

Web sites may perform user authentication to control access to certain resources, such as information, products and/or services. For example, a web site may require a user to register and sign in using credential information, such as user name and password, to access member areas of the web site. The user can gain access to the web pages located in the member areas after submitting the correct user name and password for authentication.

A typical web browser allows a web page to store a piece of information, known as a cookie (or web cookie or http cookie), which is accessible to other web pages in the same web domain. The web browser receives a cookie from a web server and provides the cookie back to the web server so that the web server can relate separate web requests via the information stored in the cookie.

A web site may use cookies to indicate that the web site has used a login page to authenticate the user of the web browser; and other web pages in the same web domain can check the cookie to determine whether the current user is an authorized user. The cookie may expire after a predetermined period of time, or after the user signs off from the web site.

For privacy and security reasons, a web browser typically prevents web pages in a first web domain from accessing a cookie set by a web page in a second web domain different from the first web domain.

There are systems that use single sign-on authentication methods, which allow a user to authenticate once and gain access to the resources of multiple systems. For example, a centralized authentication server may perform user authentication for multiple systems.

BRIEF SUMMARY

In one example embodiment, a method is provided to authorize users to anonymously access resources of different web sites. The method includes storing, by a server system, in a data storage facility of the server system, account information for user accounts for end users registered with the server system and listing data relating to entities associated with web domains not hosted by the server system. The method further includes processing, by the server system, a first transmission from an end-user device and, based at least in part on the transmission and the account information stored in the data storage facility, authenticating a first user as a registered user of a service provided by the server system. The method further includes retrieving, by the server system, from the listing data stored in the data storage facility, first information relating to a first entity associated with a first web domain not hosted by the server system. The method further includes assigning, by the server system, a first credential to the first user. The method further includes transmitting, by the server system, a second transmission to the end-user device. The second transmission includes code to cause presentation of the first information, via an application, on the end-user device. The presentation of the first information is prior to the first user having been registered with the first web domain. The code further causes presentation of a user-selectable option to initiate transition to a first web page of the first web domain consequent to a selection of the user-selectable option by forwarding or redirecting the first web page. The method further includes identifying the first user as being an authenticated user of the service with the first credential without revealing an identity of the first user. The first credential is recognizable by the first web domain as associated with the service and allows access to the first web domain based at least in part on the first credential.

In another example embodiment, one or more non-transitory, machine-readable media are provided to authorize users to anonymously access resources of different web sites. The one or more non-transitory, machine-readable media storing instructions that, when executed by a server system, cause the server system to store in a data storage facility of the server system, account information for user accounts for end users registered with the server system and listing data relating to entities associated with web domains not hosted by the server system. The instructions, when executed by the server system, further cause the server system to process a first transmission from an end-user device and, based at least in part on the transmission and the account information stored in the data storage facility, authenticate a first user as a registered user of a service provided by the server system. The instructions, when executed by the server system, further cause the server system to retrieve from the listing data stored in the data storage facility first information relating to a first entity associated with a first web domain not hosted by the server system. The instructions, when executed by the server system, further cause the server system to assign a first credential to the first user. The instructions, when executed by the server system, further cause the server system to transmit a second transmission to the end-user device. The second transmission includes code to cause presentation of the first information, via an application, on the end-user device. The presentation of the first information is prior to the first user having been registered with the first web domain. The code further causes the presentation of a user-selectable option to initiate transition to a first web page of the first web domain, where the presentation of the user-selectable option is consequent to a selection of the user-selectable option, and where the transition to a first web page is performed by forwarding or redirecting the first web page. The instructions, when executed by the server system, further cause the server system to identify the first user as being an authenticated user of the service with the first credential without revealing an identity of the first user. The first credential is recognizable by the first web domain as associated with the service and allows access to the first web domain based at least in part on the first credential.

In yet another example embodiment, a server system is provided to authorize users to anonymously access resources of different web sites. The server system includes one or more servers, a data storage facility storing account information for user accounts for end users registered with the server system and listing data relating to entities associated with web domains not hosted by the server system, and memory storing instructions. The server system is configured to execute the instructions to process a first transmission from an end-user device and, based at least in part on the transmission and the account information stored in the data storage facility, authenticate a first user as a registered user of a service provided by the server system. The server system is further configured to execute the instructions to retrieve, from the listing data stored in the data storage facility, first information relating to a first entity associated with a first web domain not hosted by the server system. The server system is further configured to execute the instructions to assign a first credential to the first user. The server system is further configured to execute the instructions to transmit a second transmission to the end-user device. The second transmission includes code to cause presentation of the first information, via an application, on the end-user device. The presentation of the first information is prior to the first user having been registered with the first web domain. The code further causes presentation of a user-selectable option to initiate transition to a first web page of the first web domain consequent to a selection of the user-selectable option by forwarding or redirecting the first web page. The server system is further configured to execute the instructions to identify the first user as being an authenticated user of the service with the first credential without revealing an identity of the first user. The first credential is recognizable by the first web domain as associated with the service and allows access to the first web domain based at least in part on the first credential.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to authorize users for anonymous access of resources of different web sites. For example, a business listing service may authenticate users and allow the authenticated users to access the resources of the businesses listed via the business listing service, without the users having to create separate accounts with the businesses and without having to reveal the identities of the users to the businesses. The disclosure includes methods and apparatuses which perform these methods, including data processing systems which perform these methods, and computer readable media containing instructions which when executed on data processing systems cause the systems to perform these methods.

Figure 1:
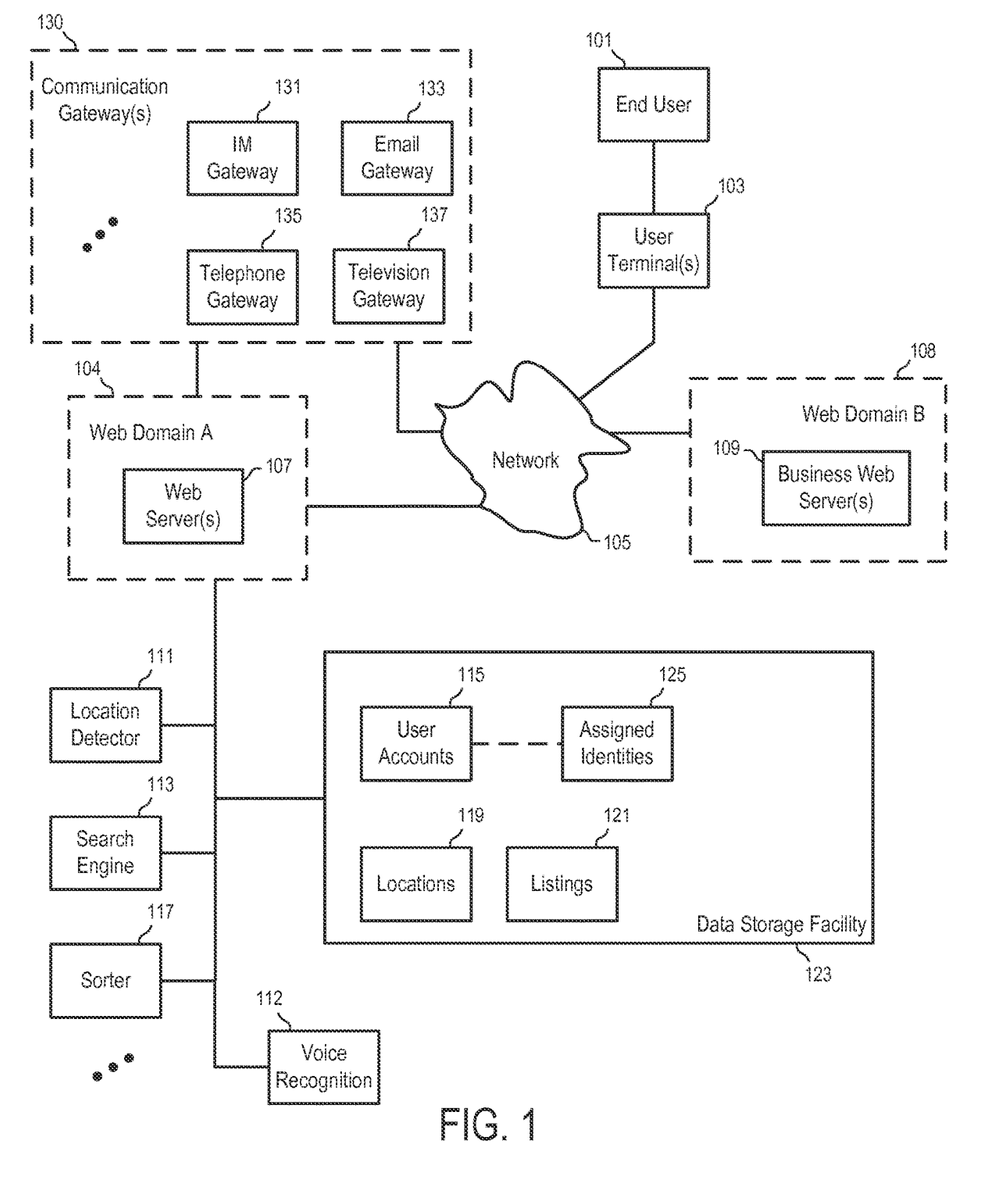
FIG. 1 shows a system to authenticate users for access to resources in different web domains according to one embodiment.

FIG. 1 shows a system to authenticate users for access to resources in different web domains according to one embodiment.

In FIG. 1, an end user (101) may use a user terminal (103) to submit a search request over the network (105) to a web server (107) in a web domain A (104) and/or to receive search results. The network (105) may include a local area network, a wireless data communication network, a telephone network, a cellular communication network, a telecommunication network, an interactive television network, a packet network, an Internet Protocol Television (IPTV) network, an intranet, or a combination of networks, such as the Internet.

The user terminal (103) may access the web server (107) via a communication gateway (130), such as an instant messaging (IM) gateway (131), an email gateway (133), a telephone gateway (135), or a television gateway (137), or other types of servers, such as an application gateway to interface different servers. Some embodiments may use one type of communication gateway to receive the search request from the user terminal (103) and other types of communication gateway to provide the search results to the same user terminal (103) or a different user terminal (103). Some embodiments may use different types of communication gateways (130) to service different types of user terminals (103).

In one embodiment, the web server (107) communicates with the user terminal (103), or the communication gateway (130), via HyperText Transfer Protocol (HTTP) and/or other types of communication protocols, such as File Transfer Protocol (FTP), Wireless Application Protocol (WAP), etc. The web server (107) may provide static web pages, dynamic web pages, and/or web services.

In some embodiments, the web server (107) provides web applications to the user terminal (103) for execution in a web browser running on the user terminal (103); and the web applications may include scripts, such as Java, JavaScript, etc., for execution within an isolated environment in a browser.

In some embodiments, the web server (107) may provide rich-client applications to the user terminal (103); and the rich-client application may be programmed in traditional programming languages, such as C/C++, to have full access to functions of the operating system running on the user terminal (103).

The web server (107) may communicate with a location detector (111), a search engine (113), and/or a sorter (117) to process the search request and present search results based on the information stored in a data storage facility (123).

In some embodiments, the location detector (111), the search engine (113), the sorter (117) and/or other modules not shown in FIG. 1, are servers communicating with the web server (107) over a network, such as a local area network, an intranet, or Internet. These servers and the communication gateways (130) may run on same or separate computers. In one embodiment, there may be one or more layers of application servers between the web server (107) and the data storage facility (123) to process the business logic and data access of the rich-client applications. Alternatively, application servers may be integrated with the web servers (107) and/or the communication gateway (130). Thus, the disclosure is not limited to particular types of connections among the communication gateways (130), the web server (107), the location detector (111), the search engine (113), the sorter (117), the data storage facility (123) and other modules not shown in FIG. 1.

In one embodiment, listings (121) of businesses, such as restaurants, car dealers, retailers, service providers, gas stations, parking lots, plumbers, and the like, may have street addresses or other location parameters, such as longitude and latitude coordinates, stored as locations (119) in the data storage facility (123). The listings (121) may include addresses, telephone numbers, advertisements, announcements, and/or events, etc.

In some embodiments, the web server (107) provides listings (121) as a directory service; and the end user (101) can search for particular types of listings (121) via the search engine (113). In one embodiment, the web server (107) provides listings (121) as advertisements, together with other types of information, such as blog entries, publications, news articles, review articles, etc.

The locations (119) may be part of the listings (e.g., 121), or associated with the listings (e.g., 121). In one embodiment, the listings (e.g., 121) are information related to business entities at corresponding geographic locations (119). Some of the entities may be advertisers who pay advertisement fees to promote their listings (121). Some of the entities may be non-advertisers who have free listings (121).

In one embodiment, in response to a search request from the end user (101) which has an indication of a location of interest, the search engine (113) identifies listings (e.g., 121) in a local area near the location of interest. The sorter (117) orders the listings (121) in the set identified by the search engine (113) to prioritize the listings (121) for presentation to the end user (101).

In one embodiment, the location detector (111) determines a location that is of interest to the end user (101) for the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that is used to submit the search request. For example, the location detector (111) may determine the location of the user terminal (103) based on a connection point the user terminal (103) used to access the network (105) (e.g., based on the location of a wireless network access point, a base station of a cellular communication system, or a connection point to a wired network). In some embodiments, the user terminal (103) automatically determines its current position (e.g., via a satellite positioning system, or a cellular positioning system) and transmits the determined or estimated position to the web server (107) with the search request, or provides the position in response to a request from the location detector (111).

In one embodiment, the web server (107) provides listings (121) in response to search requests from the user terminal (103). In another embodiment, the web server (107) provides listings (121) in response to the end user (101) browsing a category of businesses.

In one embodiment, after the user terminal (103) presents a listing (121) to the end user (101), the end user (101) may select the listing to access the resources in member areas of the business web server (109) in a web domain B (108) different from the web domain A (104) of the web server (107) that provides the listing (121).

In response to the user selection of the listing (121) that corresponds to the web server (109), the web server (107) determines if the end user (101) is already authenticated in the web domain A (104) of the web server (107). If the end user (101) is not already authenticated, the web server (107) authenticates the end user (101) based on user accounts (115) stored in the data storage facility (123). For example, the web server (107) may prompt the end user (101) to provide a user name and/or a password to sign into a user account (115) in the web domain A (104) of the web server (107).

After the end user (101) is authenticated in the web domain A (104), the web server (107) forwards or redirects the user request, or the end user (101), to the business web server (109), responsive to the user selection of the listing (121) that corresponds to the web server (109). In the forwarding or redirecting operation, the web server (107) indicates to the business server (109) in the web domain B (108) that the end user (101) is an authorized user of the web domain A (104).

In one embodiment, the web server (107) in the web domain A (104) provides its own credential to the business web server (109) to allow the end user (101) to gain access to member areas in the web domain B (108). For example, after the web server (107) in the web domain A (104) receives a web request from the user terminal (103), the web server (107) in the web domain A (104) may send the web request to the business web server (109) in the web domain B (108) to obtain a response, and then provide the response to the user terminal (103). Thus, the web server (107) in the web domain A (104) forwards requests and responses between the user terminal (103) and the business web server (109) to allow the user terminal (103) to access the web domain B (108) on behalf of the web server (107) in web domain A (104).

In one embodiment, the web server (107) in the web domain A (104) temporarily allocates one of its identities (125) and assigns the allocated identity (125) to the user account (115) for a session of the end user (101) visiting the business web server (109) in the web domain B (108). After the session, the identity (125) previously allocated to the user account (115) of the end user (101) can be allocated to a different user. Different identities (125) can be assigned to the user account (115) of the end user (101) for different sessions to improve anonymity or privacy protection for the end user (101).

When the user terminal (103) communicates with the business web server (109) in the web domain B (108) through the web server (107) in the web domain A (104), the web server (107) in the web domain A (104) can also shield the network address (e.g., Internet address) of the user terminal (103) from the business web server (109) for enhanced privacy.

In another embodiment, the web server (107) in the web domain A (104) forwards the end user (101) to the business web server (109) in the web domain B (108) so that the user terminal (103) of the end user (101) may subsequently communicate to the business web server (109) in the web domain B (108) without going through the web server (107).

For example, the web server (107) may provide a uniform resource identifier (URI) or uniform resource locator (URL) to the user terminal (103) to redirect the user terminal (103) to the business web server (109) in the web domain B (108). The URI or URL, for example, may include a code or identifier that indicates that user terminal (103) is authorized by the web server (107) to visit the business web server (109) on behalf of the web server (107). For example, the code may include the identity (125) assigned to the user account (115) of the end user (101). In one embodiment, the web server (107) provides the code to the user terminal (103) via a secure connection for enhanced security; and the user terminal (103) provides the code to the business web server (109) via a secure connection.

In one embodiment, after receiving the code, the business web server (109) in the web domain B (108) may communicate with the web server (107) to verify that the code is valid. For enhanced security, for example, the web server (109) in the web domain B (108) may provide the network identifier (e.g., Internet Protocol (IP) address) of the user terminal (103) and the received code to the web server (107) to verify that the code has been recently provided to the user terminal (103) (e.g., provided within a threshold period of time).

In some embodiments, for privacy reasons the business web server (109) may not provide the network identifier (e.g., Internet Protocol (IP) address) of the user terminal (103) to the web server (107) for verification. For enhanced security, the web server (107) may check whether the code has been recently provided within a threshold period of time (e.g., within five seconds or a minute) and whether the code has been used within the period of time since it was provided to the user terminal (103). The web server (107) may allow a single use of the code within the threshold period of time.

In one embodiment, the web server (107) assigns the identity (125) to the user account (115) of the end user (101) for a session of a predetermined period of time, or until the web domain B (108) informs the web server (107) of the end of the session.

In one embodiment, the web server (107) maintains an identity (125) and a password that represent credentials of the web server (107) with the business web server (109) in the web domain B (108). When the user terminal (103) uses the identity (125) to access a member area in the web domain B (108), the business web server (109) recognizes that the identity (125) is associated with the web server (107) and contacts the web server (107) for a password, instead of contacting the user terminal (103). If the web server (107) determines that the identity (125) is recently assigned to the user account (115) of the end user (101), the web server (107) may provide the password to the business web server (109) to complete the authentication. After verifying the password, the business web server (109) may allow the user terminal (103) to start an authenticated user session of visiting the member areas of the web domain B (108) on behalf of the web server (107) in the web domain A (104).

The business web server (109) may give a cookie to the browser on the user terminal (103) to track the authenticated user session.

Alternatively, the web server (107) may simply provide a confirmation message that the use of the identity (125) is valid, without having to provide a password, if the business web server (109) trusts the web server (107) that provides the listing (121) on behalf of the business web server (109).

In one embodiment, the web server (107) may have different types of user accounts (115), such as general user accounts (115) and master user accounts (115). An end user (101) having a general user account (115) may access the member areas within the web domain A (104) but may not have the privilege to access the member areas within the web domain B (108) on a business web server (109) via the listing (121). An end user (101) having a master user account (115) has the privilege to access the member areas the web domain B (108) via the listing (121).

For example, an end user (101) may sign in as a master user to gain access the web services of a business listing (121) or an advertisement listing (121) as a validated master user. The end user (101) can then use the corresponding web site to make purchases, send email, view premium content, etc., without having to separately identify themselves via different sets of credentials (e.g., login, passwords, payment and shipping information, etc.).

In one embodiment, to protect the payment information, the web server (107) charges the end user (101) according to the user account (115) and pays the business web server (109) on behalf of the end user (101).

In one embodiment, to protect the shipping information, the operator of the web server (107) receives products from the operator of the business web server (109) and forwards the products to the end user (101).

Alternatively, the web server (107) may release the payment information and/or the shipping information when such information is needed to complete a transaction.

Since the master user accounts (115) allow the users (101) of the web server (107) to seamlessly access the products and/or services of the business web server (109) via the listings of the business web server (109) presented by the web server (107), without the user (101) having to create separate accounts in different web sites, the master user accounts (115) can drastically increase the user base of the business web server (109).

The technologies disclosed herein can be used, for example, in a website such as YELLOWPAGES.COM. For example, when an end user (101) is logged in as a master user in YELLOWPAGES.COM, the end user (101) can conveniently access the products or services of any listings (121) that use the master user option. As soon as the user (101) discovers a master user enabled listing in YELLOWPAGES.COM, the user (101) may access the products or services at the corresponding web site of the listing (121) without the need to create a new account (115) and sign up to the new web site.

In one embodiment, the web server (107) associates the assigned identities (125) exposed to the web server (109) randomly with the user accounts (115) to provide enhanced privacy for the users. The users (101) can keep their sensitive information within the web domain A (104) (e.g., YELLOWPAGES.COM) and conveniently access web sites listed (121) or advertised via the web server (107) in the web domain A (104) (e.g., YELLOWPAGES.COM).

On the business web server (109) side, enabling the master user option will increase sales due to improved availability, convenience, speed and ease of making purchases with users (101) of the web server (107). The business web server (109) can also track the sales and web visits that are directed to the business web server (109) via the listings (121) presented through the web server (107) (e.g., YELLOWPAGES.COM).

In one embodiment, the terminal (103) of the end user (101) is a data processing system, such as a notebook computer, a personal computer, a workstation, a network computer, a personal digital assistant (PDA), a mobile phone, a cellular phone, a landline phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (133) via email, or to an IM gateway (131) via instant messaging, or to a telephone gateway (135) via a telephone call, or to a television gateway (137) via an interactive television system. Some embodiments may use other types of gateways not shown in FIG. 1, such as gateways for SMS. Thus, the disclosure is not limited to the examples or combinations illustrated in FIG. 1.

In some embodiments, the end user (101) may use one user terminal (103) to submit the search request and another user terminal (103) to receive the search results. The different user terminals (103) are associated with each other and may be considered as a combined user terminal (103). For example, the user (101) may submit the search request via an SMS message through one user terminal (103), and receive the search results at another user terminal (103) via email. For example, the user may submit the search request via voice through one user terminal (103) and receive the search results via a web page at another user terminal (103) or at the same user terminal (103). For example, in one embodiment, the user (101) may use a mobile phone as the user terminal (103) to transmit voice information, via a data connection through the network (105) and the web server (107) (via email gateway (131), or IM gateway (133), or other data communication gateways), or a telephone connection through a telephone gateway (135), to a voice recognition system (112) to formulate a search and to receive a web page or email at the same user terminal (103) or at another user terminal (103) that shows the results of the search.

In one embodiment, one computer system implements the web servers (107), the location detector (111), the search engine (113), and the sorter (117). Alternatively, different processes running on one or more shared computers may implement some of the components (107, 111, 113, and 117). For example, one computing module, thread, or process may implement multiple of the components (107, 111, 113, and 117). In some embodiments, special purpose data processing systems, such as Application-Specific Integrated Circuits (ASICs) or Field-Programmable Gate Arrays (FPGAs), may implement one or more of the components (107, 111, 113, and 117). In some embodiments, processes running according to software instructions on general purpose data processing systems, such as general purpose personal computers or server computers, can implement the components (107, 111, 113, and 117). Thus, the implementations are not limited to hardware, software, or particular combinations of hardware and software.

Different embodiments may implement the data storage facility (123) in different ways. For example, one or more data processing systems may store the information about the user accounts (115), assigned identities (125), listings (121) and their geographic locations (119), etc. For example, the data storage facility (123) may include one or more relational or object oriented databases, or flat files on one or more computers or networked storage devices, etc. The data storage facility (123) may be a centralized system, or include a distributed system, such as a peer to peer network, or Internet.

Figure 2:
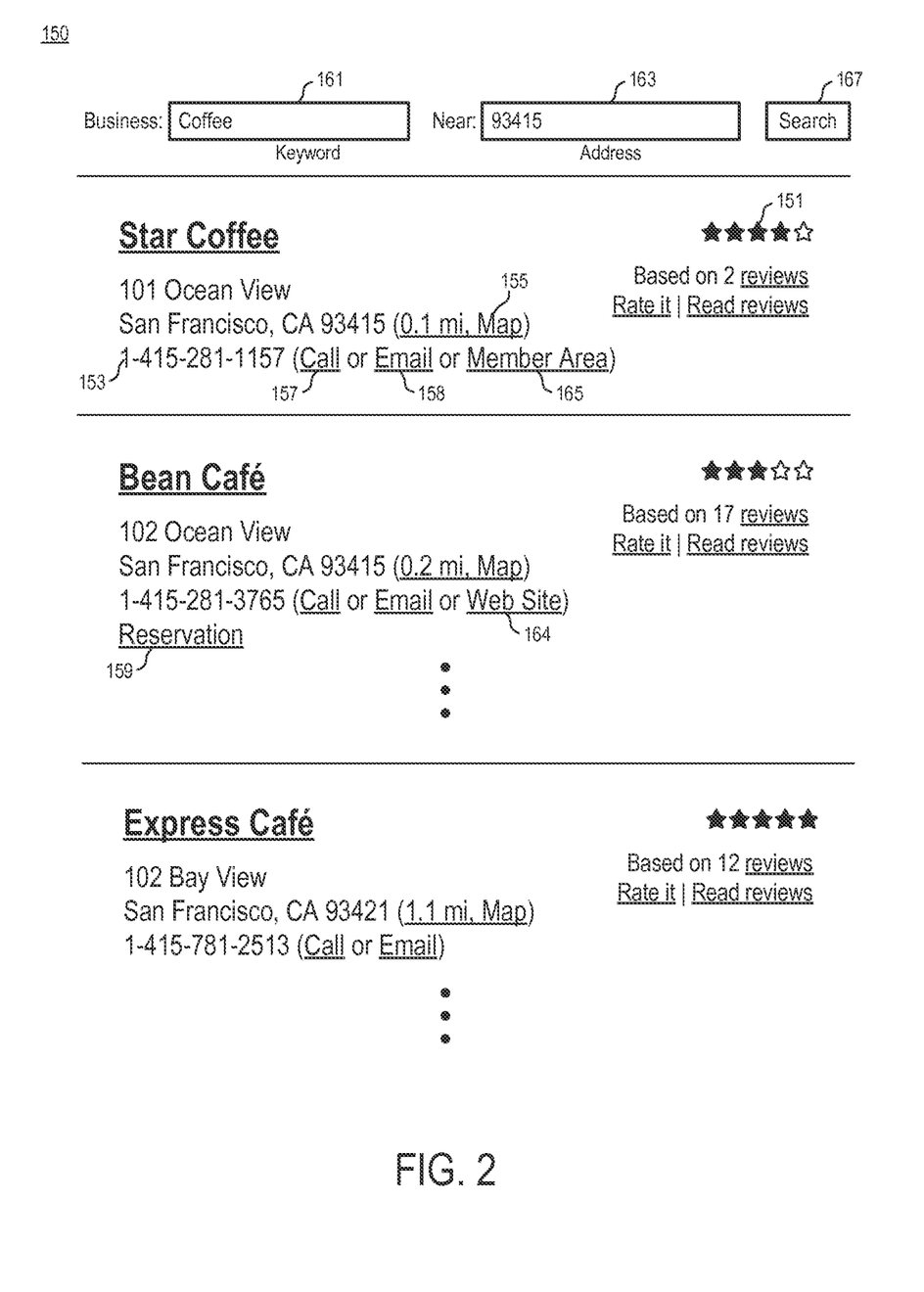
FIG. 2 illustrates a user interface to access member areas of web sites via business listings according to one embodiment.

FIG. 2 illustrates a user interface to access member areas of web sites via business listings (121) according to one embodiment. In FIG. 2, a user terminal (103) provides a search user interface (150), which includes an input box (161) to receive one or more keywords, and an input box (163) to receive a location of interest.

In FIG. 2, after the end user (101) specifies the keyword in the input box (161) and the location of interest in the input box (163), the end user (101) can select the search button (167) to search for listings (121) of businesses that match the keyword and that are located near the location of interest.

After the search interface (150) receives the selection of the search button (167), the user terminal (103) submits the search request to web server(s) (107).

In one embodiment, the end user (101) implicitly specifies the location of interest based on the location of the user terminal (103), or based on a preference setting of the end user (101). In one embodiment, the location detector (111) determines the location of the user terminal (103) or the preference setting of the end user (101); and the input box (163) presents the location determined by the location detector (111) for verification and/or for modification.

For example, the user terminal (103) (e.g., with a global positioning system (GPS) unit) or the location detector (111) can automatically determine the current location of the user terminal (103) that presents the search user interface (150). The input box (163) displays the automatically determined location of the user terminal (103) as a default location; and the user may specify an alternative location via the input box (163) or via the link (165).

In FIG. 2, the user interface (150) presents the search results under the input boxes (161 and 163). In the example illustrated in FIG. 2, the user interface (150) presents listings (121) of business products and services in response to a search request.

In one embodiment, the listing (121) represents a business of products or services. The technologies disclosed herein can be used, for example, in a web site such as YELLOWPAGES.COM. The business entity of the listing (121) may pay a fee to become an advertiser or not pay a fee to have a free listing (121).

In FIG. 2, the user interface (150) presents a listing (121), such as the listing (121) for "Star Coffee", with various information about the business entity of the listing (121), including the street address, a telephone contact (153), a distance (155) to the location of interest, a user rating (151), a link (157) to initiate a telephone call to an entity of the listing (121), and the link (165) to access the member area of the web site of "Star Coffee".

In one embodiment, if the end user (101) selects the link (165) to access the member area of the web site of "Star Coffee", the web server (107) determines whether the end user (101) has been authenticated for the privilege of accessing the member areas via the listings (121). If the end user (101) has not been authenticated by the web server (107), the web server (107) prompts the end user (101) for credentials, or asks the end user (101) to sign up for the privilege to access the member areas of listings (121) presented by the web server (107). If the end user (101) has been authenticated by the web server (107), the web server (107) forwards or redirects the end user (101) to the business web server (109) to access the web site of "Star Coffee".

In some embodiments, the user terminal (103) presents the "Member Area" link (165) as illustrated in FIG. 2, if the end user (101) has already been authenticated for the privilege; and the user terminal (103) presents a different link, if the end user (101) has not yet been authenticated for the privilege to access member areas of listings (121) presented by the web server (107).

In FIG. 2, the end user (101) may select the link (159) to initiate a reservation process, which may not require authentication.

In one embodiment, the advertiser pays a predetermined fee for priority in the display of the listings (121). For example, the advertiser may pay a monthly advertisement fee, or an advertisement fee charged for a predetermined number of presentations, to obtain a high priority in the ranking of the listings (121).

In one embodiment, the advertiser pays a predetermined fee when the end user (101) visits and/or makes purchases in the member areas via the listings (121) presented by the web server (107) to the end user (101), who is authenticated by the web server (107) as having the privilege to access the member areas of the business web server (109) presented by the web server (107).

In another embodiment, the advertiser pays a predetermined fee when a link presented in the listing (121) forwards the end user (101) to a web location specified by the advertiser, such as a web site of the advertiser. In one embodiment, the advertiser pays a predetermined fee when the end user (101) calls the advertiser using the telephone contact provided in the listing (121).

In one embodiment, the operator of the search engine (113) specifies the predetermined advertisement fees. In another embodiment, the advertiser specifies and offers the predetermined advertisement fees; and the advertisers can adjust the offer of the advertisement fees to balance the need for a high ranking and the cost.

In FIG. 2, the listings (121) provide a "call" link (157) to allow a customer to request a call back to the customer for a phone connection to the advertiser. When a telephonic device (e.g., a mobile phone or a computer having a phone implemented partially via software, etc.) presents the listing (121), the customer can use the "call" link (157) to initiate a call from the telephonic device.

In FIG. 2, the listings (121) provide an "email" link (158) to send the listing (121) and/or the phone number via email to an address specified by the user. In some embodiments, the user interface (150) also provides the end user (101) with an option to send the phone number via SMS, an option to save the listing (121) as a note, etc.

In FIG. 2, the listing (121) for "Bean Café" includes a "Web Site" link (164), which when selected by the end user (101) forwards the end user (101) to the web site of the business "Bean Cafe," or an information page hosted on the web server (107) to provide further details about the business, such as the business hours, payment options accepted by the business, a detailed description of the business, videos related to the business, etc.

In FIG. 2, the listings (121) also include links related to customer ratings (151) of the businesses based on feedback from prior customers of the business. For example, the end user (101) may read reviews written by other users, or write about and/or rate the business.

In some embodiments, the listings (121) include banner or video advertisements (not shown in FIG. 2) from the corresponding entities of the listings (121). The listings (121) may include links to web locations specified by the advertisers.

In one embodiment, the heading "Star Coffee" includes a link to a web site of the business/advertiser of the listing (121). When the end user (101) selects the link, the link directs the end user (101) to the web site of the business/advertiser; and the advertiser may pay a per-selection advertisement fee, for the end user (101) that is directed by the link to the web site of the business/advertiser.

Alternatively or in combination, the end user (101) may call the telephone contact (153) provided in the listing (121); after a connection server connects the telephone call from the end user (101) to the business/advertiser, the advertiser may pay a per-call advertisement fee, responsive to the call that is directed by the telephone contact (153) to the business/advertiser.

In one embodiment, to track the calls forwarded to the business/advertiser, the listing (121) provides a telephone number of a connection server as the telephone contact (153) of the listing (121). When the connection server receives the call to the telephone number of the connection server, the connection server routes or forwards the call to the telephone number of the business/advertiser, or makes a separate call to the telephone number of the business/advertiser and bridges the calls to make the connection.

Figure 3:
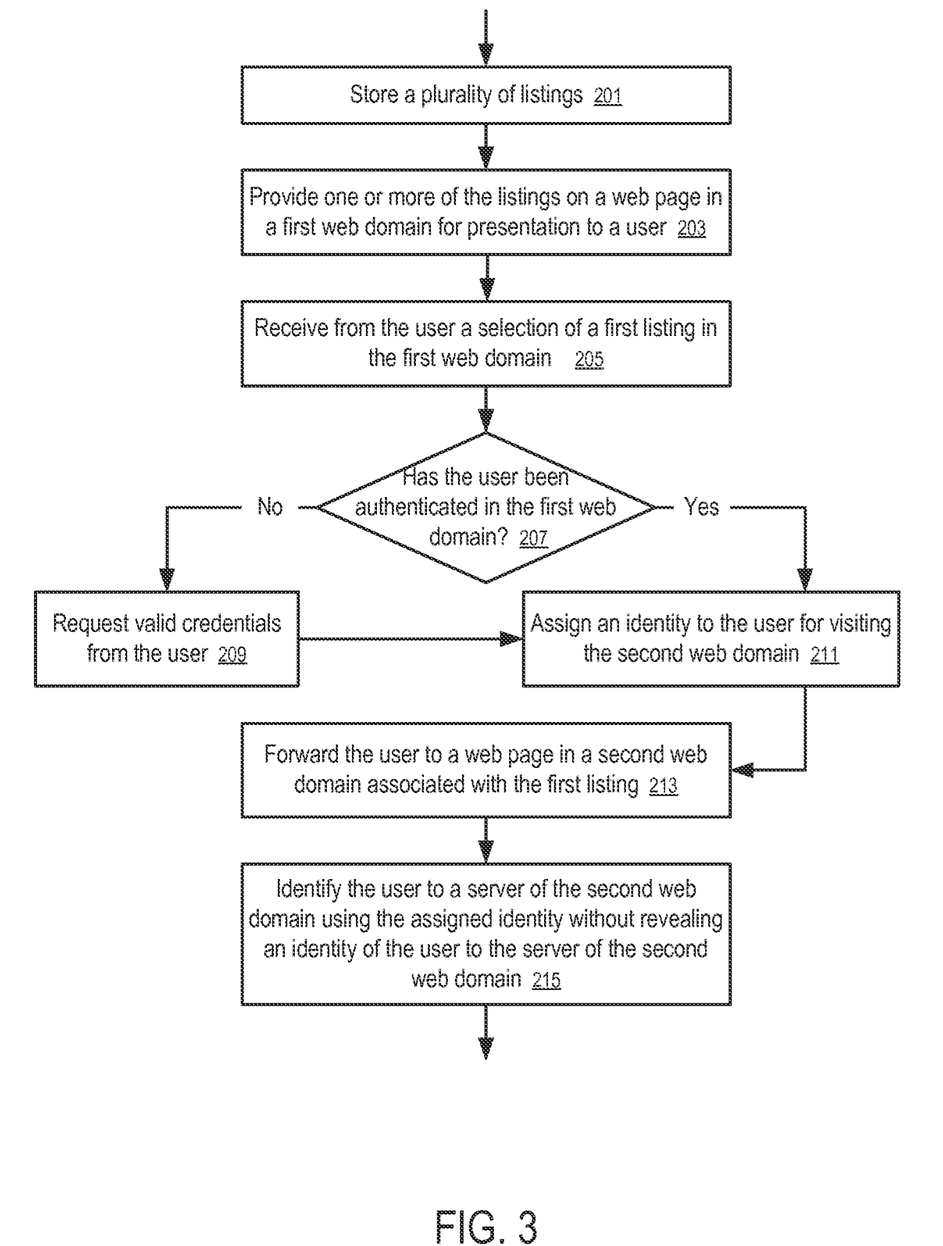
FIG. 3 illustrates a method to provide access to resources in different web domains according to one embodiment.

FIG. 3 illustrates a method to provide access to resources in different web domains according to one embodiment. In FIG. 3, the data storage facility (123) stores (201) a plurality of listings (121). The web server (107) provides (203) one or more of the listings (121) on a web page in a first web domain (104) for presentation to an end user (101) over the network (105). After receiving (205) from the end user (101) a selection of a first listing (121) in the first web domain (104), the web server (107) (or an application server) determines (207) whether the end user (101) has been authenticated in the first web domain (104).

For example, a first entity may operate the web server (107) to provide a listing (121) of services or products of a second entity which operates the business web server (109). The listing (121) may include a telephonic contact of the second entity and/or an advertisement of the second entity.

If (207) the end user (101) has not yet been authenticated in the first web domain (104), the web server (107) requests (209) valid credentials from the end user (101) for authentication against the user accounts (115) in the first web domain (104).

After the end user (101) has been authenticated in the first web domain (104), the web server (107) (or an application server) assigns (211) an identity to the end user (101) for visiting the second web domain (108). For example, the web server (107) (or an application server) may assign an identity (125) to the user account (115) of the end user (101); and the identity (125) represents the end user (101) during the visit of the end user (101) in the second web domain (108).

The web server (104) communicates with the user terminal (103) to forward (213) the end user (101) to a web page in a second web domain (109) associated with the first listing (121).

The web server (104) identifies (215) the end user (101) to the server (109) of the second web domain (108) using the assigned identity (125) without revealing an identity of the end user (101) to the server (109) of the second web domain (108).

In one embodiment, the web server (104) randomly selects one of its identities (125) that are not currently used by other end users (101) and assigns the selected identity (125) to the end user (101). Thus, the assigned identity (125) can be used to identify the end user (101) within a session of the end user (101) visiting the second web domain (108). The same assigned identity (125) may be used to represent a different end user (101) in a different session of visiting the second web domain (108). In one embodiment, the web server (104) selects assigned identities (125) to avoid overlapping in sessions of different users (101) using the same assigned identity (125).

In one embodiment, the web server (107) does not provide information from the user account (115) of the end user (101) to the business web server (109) during the session of the end user (101) visiting the second web domain (108).

In one embodiment, access to the web page in the second web domain (109) requires authentication. The web server (107) provides its credential information, instead of the credentials of the end user (101), to authenticate the end user (101) in the second web domain (108) and thus allows the end user (101) to visit the second web domain (108) on behalf of or in the name of, the web server (107).

In one embodiment, the web page in the second web domain (108) provides information for a fee. The first entity that operates the web server (107) pays the second entity the fee for the information accessed by the end user (101) and separately charges the end user (101) for accessing the information.

In one embodiment, the web page in the second web domain (108) allows the end user (101) to purchase a product. The first entity that operates the web server (107) provides shipping information of the end user (101) to the second entity for the product purchased by the end user (101) via the web page of the second entity.

In one embodiment, the web page in the second web domain (108) allows the end user (101) to purchase a service or product. The first entity that operates the web server (107) receives and forwards the service or product purchased by the end user (101) from the second entity to the end user (101) without revealing an address of the end user (101), such as a street address, a postal address or an Internet address.

Figure 4:
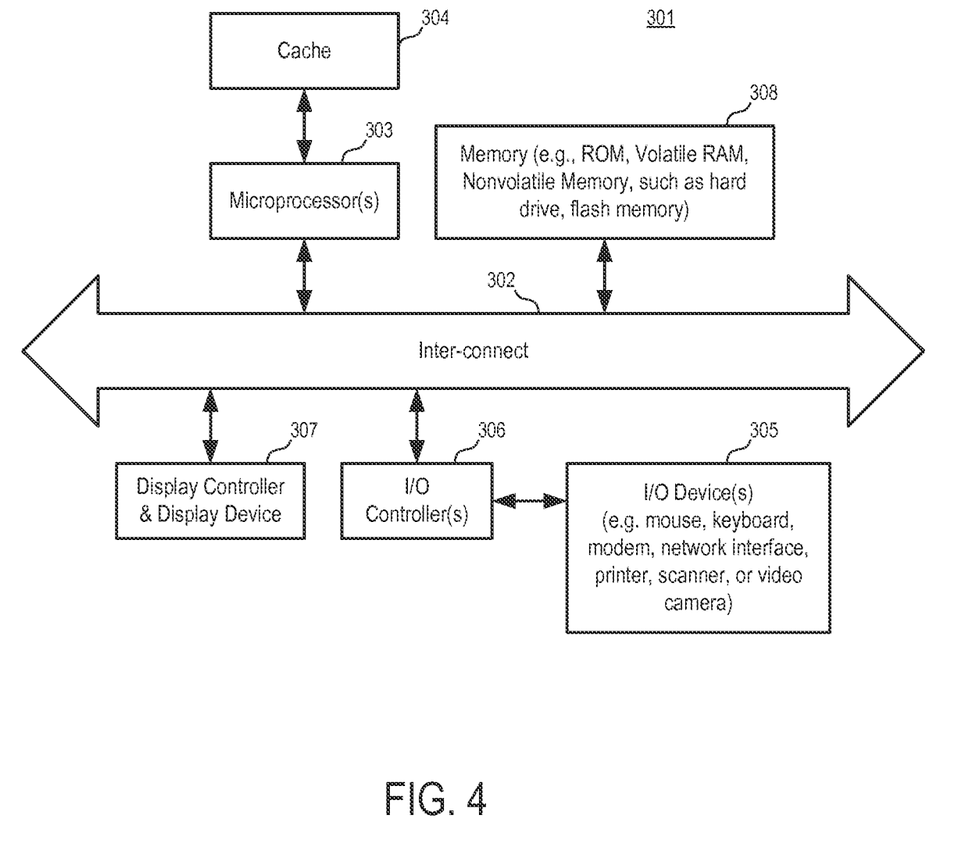
FIG. 4 illustrates a data processing system which can be used in various embodiments.

FIG. 4 illustrates a data processing system which can be used in various embodiments. While FIG. 4 illustrates various components of a computer system, it is not intended to represent any particular architecture or manner of interconnecting the components. Some embodiments may use other systems that have fewer or more components than those shown in FIG. 4.

In one embodiment, a server data processing system illustrated in FIG. 4 implements at least one of the components shown in FIG. 1, such as the web server(s) (107 and 109), the location detector (111), the search engine (113), the sorter (117), and/or the storage facility (123), etc. In some embodiments, one or more of the components shown in FIG. 1, such as the web server(s) (107 and 109), the location detector (111), the search engine (113), the sorter (117), and/or the storage facility (123), etc. may include the service of a peer to peer network of a plurality of data processing systems as illustrated in FIG. 4, or a network of distributed computing systems. In some embodiments, a server data processing system as illustrated in FIG. 4 may include a peer to peer network, or a distributed computing system.

In one embodiment, a user terminal (103) is a data processing system as illustrated in FIG. 4.

In FIG. 4, the data processing system (301) includes an inter-connect (302) (e.g., bus and system core logic), which interconnects a microprocessor(s) (303) and memory (308). The microprocessor (303) is coupled to cache memory (304) in the example of FIG. 4.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   storing, by a server system, in a data storage facility of the server system, account information for user accounts for end users registered with the server system and further storing listing data relating to entities associated with web domains that are different than a second web domain provided by the server system;
   receiving, at the server system in the data storage facility from a user terminal of an end user, an end user search request for accessing the web domains that are different than the second web domain;
   determining, by the server system, if an authentication of the end user has already occurred through the server system in the second web domain and if not already authenticated, authenticating the end user for a listing service provided by the server system in response to the end user search request based at least in part on account information for user accounts stored in the data storage facility;
   retrieving, by the server system, from the listing data stored in the data storage facility, first information relating to a first entity associated with a first web domain, where the first web domain is provided by at least one server, and said first web domain is different from the second web domain provided by the server system;
   allocating, by the server system in the second web domain, and assigning an identity to the end user, wherein said identity represents first credentials for a session of the end user visiting the first web domain provided by the at least one server that is different than the second web domain;
   redirecting communication through the server system in the second web domain provided by the server system, whereby the user terminal of the end user gains access to the first entity associated with the first web domain that is different than the second web domain provided by the server system, thereby accessing products or services of said first entity, via the user terminal without the end user through the user terminal having to separately identify to the first web domain via a separate identity different than the identity assigned to the end user, and further presenting a user-selectable option to access a first web page of the first web domain in response to (a) providing access to the products or services relating to the first entity and (b) identifying the end user as being an authenticated user of the service provided through the second web domain provided by the server system based in part on the identity assigned to the end user without revealing an identity of the end user to the at least one server of the first web domain;
   wherein the first credentials are recognizable by the first web domain as associated with the products or services and allow access to the first web domain based at least in part on the first credentials; and wherein assigning, by the server system, the identity to the end user that represents the first credentials for the session of the end user visiting the first web domain comprises temporarily assigning a selected allocated identity provided by the server system, wherein the selected allocated identity is randomly selected, by the server system, from among a plurality of allocated identities that are not currently being utilized by other users, to thereby establish a session through the server system in the second web domain between the end user and the first web domain.

2. The method of claim 1, further comprising:
storing, by the server system, in the data storage facility of the server system, the first credentials;
processing, by the server system, a transmission from the at least one server of the first web domain consequent to the first credentials being transmitted to the first web domain; and
responsive to the transmission, identifying, by the server system, a second credential from the first credentials and transmitting, by the server system, the second credential to the at least one server of the first web domain;
wherein the access to the first web domain is allowed based at least in part on the second credential.

3. The method of claim 2, wherein
the first credentials correspond to the selected allocated identity assigned by the server system to the end user, wherein the method further comprises:
assigning the second credential to the end user by assigning from among the plurality of allocated identities not currently being utilized; and
transmitting the second credential to the at least one server of the first web domain.

4. The method of claim 3, further comprising:
determining, by the server system, whether the selected allocated identity was previously assigned to the end user within a threshold period of time, wherein the transmitting the second credential is contingent on the determining that the selected allocated identity was previously assigned to the end user within the threshold period of time.

5. The method of claim 2, wherein:
the first credentials correspond to a first code assigned by the server system to the end user; and
the second credential is transmitted to the at least one server of the first web domain if the first code is assigned to the end user.

6. The method of claim 1, further comprising:
processing, by the server system, a transmission from the at least one server of the first web domain consequent to the first credentials being transmitted to the first web domain; and
responsive to the transmission, transmitting, by the server system, a confirmation message to the at least one server of the first web domain;
wherein the access to the first web domain is allowed based at least in part on the first credentials and the confirmation message.

7. The method of claim 1, wherein the listing service provided by the server system corresponds to the second web domain hosted by the server system.

8. The method of claim 1, further comprising:
reassigning the allocated identity selected from the plurality of allocated identities to a different user, in response to ending the session with the end user and the first web domain; and
utilizing the reassigned allocated identity to establish a session between the different user and the first web domain.

9. One or more non-transitory, machine-readable media storing instructions that, when executed by a server system, cause the server system to:
store, in a data storage facility of the server system, account information for user accounts for end users registered with the server system and further store listing data relating to entities associated with web domains that are different than a second web domain provided by the server system;
receive, at the server system in the data storage facility from a user terminal of an end user, an end user search request for accessing the web domains that are different than the second web domain;
determine if an authentication of the end user has already occurred through the system server in the second web domain provided by the server system and if not already authenticated, authenticate the end user for a listing service provided by the server system in response to the end user search request based at least in part on account information for user accounts stored in the data storage facility;
retrieve, from the listing data stored in the data storage facility, first information relating to a first entity associated with a first web domain, where the first web domain is provided by at least one server, and where said first web domain is different from the second web domain provided by the server system;
allocate, by the server system in the second web domain provided by the server system, and assign an identity to the end user, wherein said identity represents first credentials for a session of the end user visiting the first web domain provided by the at least one server that is different than the second web domain;
redirect communication through the server system in the second web domain, whereby the user terminal of the end user gains access to the first entity associated with the first web domain that is different than the second web domain provided by the server system, thereby accessing products or services of the first entity, via the user terminal without the end user through the end user terminal having to separately identify to the first web domain via a separate identity different than the identity assigned to the end user, and present a user-selectable option to access a first web page of the first web domain in response to (a) providing access to the products or services relating to the first entity and (b) identifying the end user as being an authenticated user of the service provided through the second web domain provided by the server system based in part on the identity assigned to the end user without revealing an identity of the end user to the at least one server of the first domain;
wherein the first credentials are recognizable by the first web domain as associated with the products or services and allow access to the first web domain based at least in part on the first credentials; and
wherein assigning the identity to the end user that represents the first credentials for the session of the end user visiting the first web domain comprises temporarily assigning a selected allocated identity, provided by the server system, wherein the selected allocated identity is randomly selected, by the server system, from among a plurality of allocated identities that are not currently being utilized by other users, to thereby establish a session through the server system in the second web domain server between the end user and the first web domain.

10. The one or more non-transitory, machine-readable media of claim 9, wherein the instructions, when executed, further cause the server system to:
store, in the data storage facility of the server system, the first credentials;
process a transmission from the at least one server of the first web domain consequent to the first credentials being transmitted to the first web domain; and
responsive to the transmission, identify a second credential from the first credentials and transmit the second credential to the at least one server of the first web domain;
wherein the access to the first web domain is allowed based at least in part on the second credential.

11. The one or more non-transitory, machine-readable media of claim 10, wherein:
the first credentials correspond to the selected allocated identity assigned by the server system to the end user; and
the second credential is transmitted to the at least one server of the first web domain.

12. The one or more non-transitory, machine-readable media of claim 11, wherein the instructions, when executed, further cause the server system to:
determine whether the selected allocated identity was previously assigned to the end user within a threshold period of time, wherein the transmitting the second credential is contingent on the determining that the selected allocated identities were previously assigned to the end user within the threshold period of time.

13. The one or more non-transitory, machine-readable media of claim 10, wherein:
the first credentials correspond to a first code assigned by the server system to the end user; and
the second credential is transmitted to the at least one server if the first code is assigned to the end user.

14. The one or more non-transitory, machine-readable media of claim 9, wherein the instructions, when executed, further cause the server system to:
process a transmission from the at least one server of the first web domain consequent to the first credentials being transmitted to the first web domain; and
responsive to the transmission, transmit a confirmation message to the at least one server of the first web domain;
wherein the access to the first web domain is allowed based at least in part on the first credentials and the confirmation message.

15. The one or more non-transitory, machine-readable media of claim 9, wherein the listing service provided by the server system corresponds to the second web domain hosted by the server system.

16. The one or more non-transitory, machine-readable media of claim 9, wherein the instructions, when executed, further cause the server system to:
reassign the allocated identity selected from the plurality of allocated identities to a different user, in response to ending the session with the end user and the first web domain; and
utilize the reassigned allocated identity to establish a session between the different user and the first web domain.

17. A system comprising:
a server system comprising one or more servers, a data storage facility storing account information for user accounts for end users registered with the server system and further storing listing data relating to entities associated with web domains that are different than a second web domain provided by the server system, and memory storing instructions, wherein the server system is configured to execute the instructions to:
receive, at the server system in the data storage facility from a user terminal of an end user, an end user search request for accessing the web domains that are different than the second web domain;
determine if an authentication of the end user has already occurred through the server system in the second web domain provided by the server system and if not already authenticated, authenticating the end user for a listing service provided by the server system in response to the end user search request based at least in part on account information for user accounts stored in the data storage facility;
retrieve, from the listing data stored in the data storage facility, first information relating to a first entity associated with a first web domain, where the first web domain is provided by at least one server, and where said first web domain is different from the second web domain provided by the server system;
allocate, by the server system in the second web domain provided and assign an identity to the end user, wherein said identity represents first credentials for a session of the end user visiting the first web domain provided by the at least one server that is different than the second web domain;
redirect communication through the server system in the second web domain server provided by the server system, whereby the user terminal of the end user gains access to the first entity associated with the first web domain that is different than the second web domain provided by the server system, thereby accessing products or services of said first entity, via the user terminal without the end user through the user terminal having to separately identify to the first web domain via a separate identity different than the identity assigned to the end user, and further present a user-selectable option to access a first web page of the first web domain in response to (a) providing access to the products or services relating to the first entity and (b) identifying the end user as being an authenticated user of the service provided through the second web domain provided by the server system based in part on the identity assigned to the end user without revealing an identity of the end user to the at least one server of the first web domain;
wherein the first credentials are recognizable by the first web domain as associated with the products or services and allow access to the first web domain based at least in part on the first credentials credential; and
wherein assigning the identity to the end user that represents the first credentials for the session of the end user visiting the first web domain comprises temporarily assigning a selected allocated identity, provided by the server system, wherein the selected allocated identity is randomly selected, by the server system, from among a plurality of allocated identities that are not currently being utilized by other users, to thereby establish a session through the second web domain between the end user and the first web domain.

18. The system of claim 17, wherein the server system is further configured to execute the instructions to:
- store, in the data storage facility of the server system, the first credentials;
- process a transmission from the at least one server of the first web domain consequent to the first credentials being transmitted to the first web domain; and
- responsive to the transmission, identify a second credential from the first credentials and transmit, by the server system, the second credential to the at least one server of the first web domain;
- wherein the access to the first web domain is allowed based at least in part on the second credential.

19. The system of claim 18, wherein:
- the first credentials correspond to the selected allocated identity assigned by the server system to the end user;
- said second credential is assigned to the end user by assigning from among the plurality of allocated identities not currently being utilized; and
- said second credential is transmitted to the at least one server of the first web domain.

20. The system of claim 19, wherein the server system is further configured to execute the instructions to:
- determine whether the selected allocated identity was previously assigned to the end user within a threshold period of time, wherein the transmitting the second credential is contingent on the determining that the selected allocated identity was previously assigned to the end user within the threshold period of time.

21. The system of claim 18, wherein:
- the first credentials correspond to a first code assigned by the server system to the end user; and
- the second credential is transmitted to the at least one server if the first code is assigned to the end user.

22. The system of claim 17, wherein the server system is further configured to execute the instructions to:
- process a transmission from the at least one server of the first web domain consequent to the first credentials being transmitted to the first web domain; and
- responsive to the transmission, transmit a confirmation message to the at least one server of the first web domain;
- wherein the access to the first web domain is allowed based at least in part on the first credentials and the confirmation message.

23. The system of claim 17, wherein the server system is further configured to execute the instructions to:
- reassign the allocated identity selected from the plurality of allocated identities to a different user, in response to ending the session with the end user and the first web domain; and
- utilize the reassigned allocated identity to establish a session between the different user and the first web domain.

* * * * *